Sept. 23, 1941.     A. G. B. METCALF     2,256,595
PHOTOELECTRIC SYSTEM
Filed July 13, 1939     2 Sheets-Sheet 1
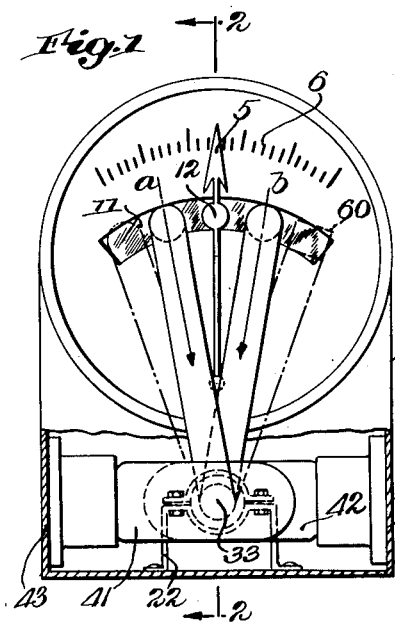
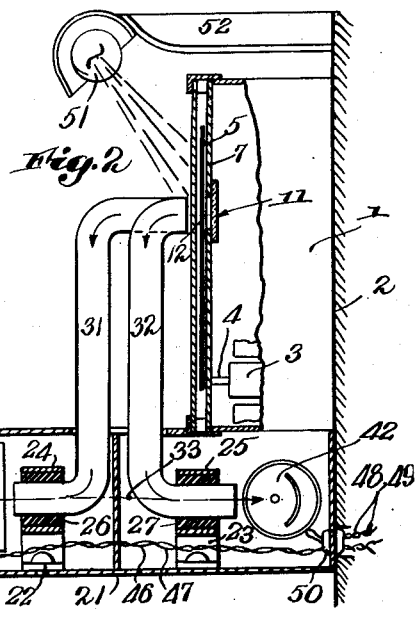
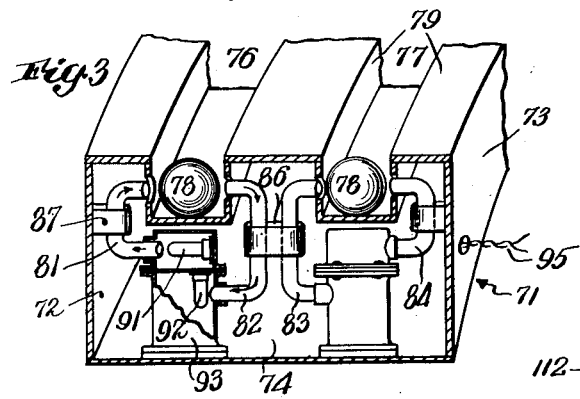
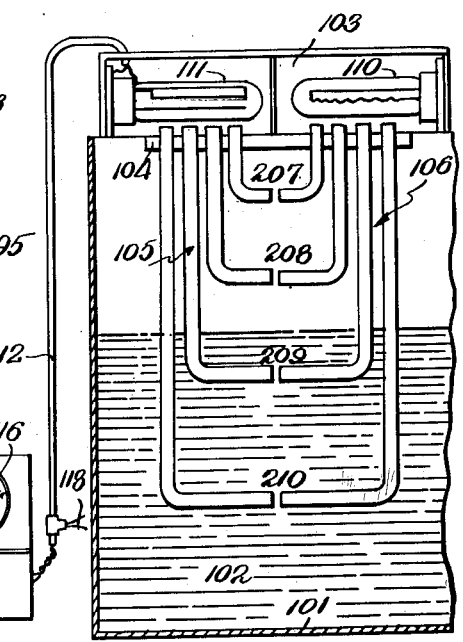
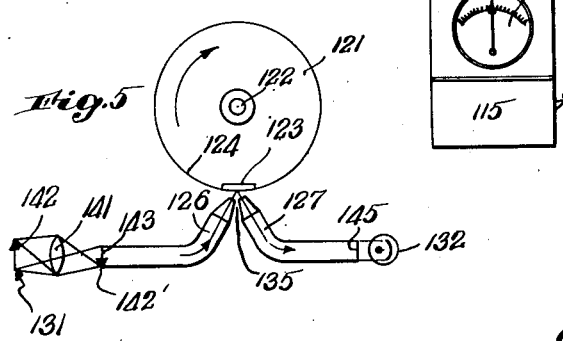
Inventor:
Arthur G. B. Metcalf,
by Roberts, Cushman & Woodberry
his Attys.

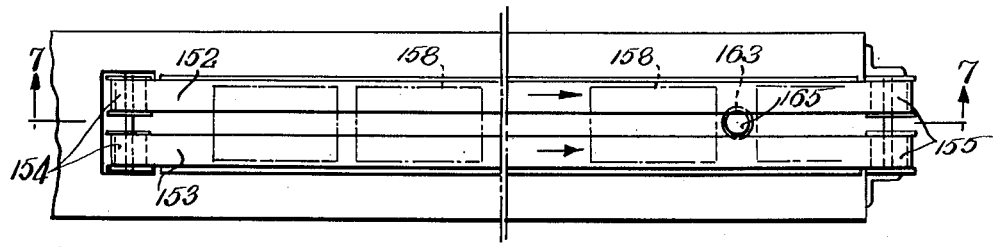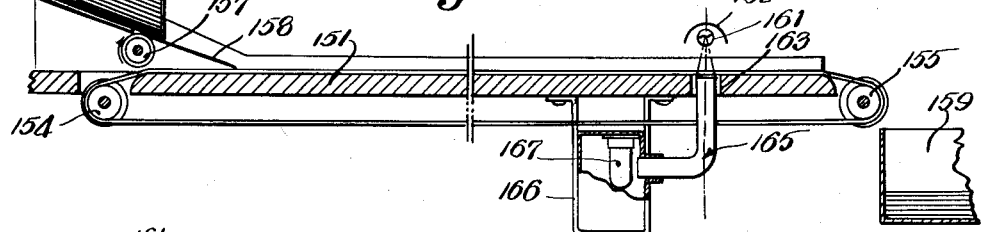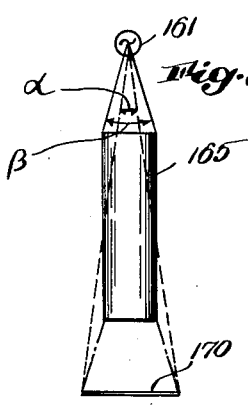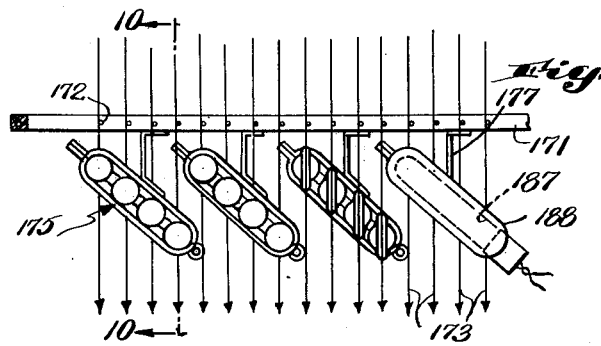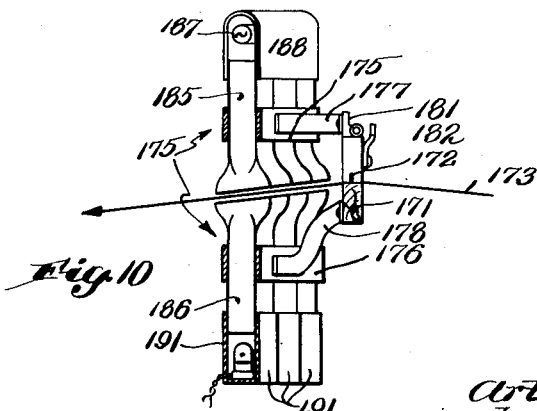

Patented Sept. 23, 1941

2,256,595

UNITED STATES PATENT OFFICE 2,256,595

PHOTOELECTRIC SYSTEM

Arthur G. B. Metcalf, Milton, Mass., assignor to Photoswitch Incorporated, Cambridge, Mass., a corporation of Massachusetts Application July 13, 1939, Serial No. 284,305

5 Claims. (Cl. 250—41.5)

This invention relates to photoelectrically controlled devices employing a light sensitive element, which is part of a control circuit and in the path of light rays, whereby intensity changes of the light impinging on the element affect its impedance and correspondingly condition the control circuit which then initiates a desired operation. Although it has been proposed for such purposes to concentrate light rays by optical means and to deviate a light beam by means of reflectors, the usefulness and applicability of such arrangements is often restricted by the necessity of aligning light source and photoelectric cell, and of using inconvenient optical systems.

According to the present invention, light rays (herein referred to as "beam") controlling the light sensitive element (herein referred to as "cell") of a photoelectric circuit are guided through at least part of their path from the light source (herein referred to as "source") to the cell in a light confining element (herein referred to as "light conductor") which is correlated to the object which controls the effective light flux (herein referred to as "object"). Light conductors of this type are solid rods, bent to suitable shapes, of refractive material as quartz glass or plastic material of the type of polymerized methyl methacrylate and having polished surfaces. Light projected into one end surface of such a rod is reflected within the rod, and with very little loss of light flux is emitted at the other end surface, regardless of curvatures or changes of cross-section of the rod. The introduction of such a light conductor into photoelectric control systems considerably extends the usefulness of such devices and permits their application to purposes for which they could heretofore not be used.

It is the principal object of the invention to control light paths of photoelectric arrangements by confining effective beams in suitably arranged light conductors. In one of its aspects, the invention permits the use of photoelectric set-ups in situations where alignment of source, object and cell is impractical or impossible, or where the environment restricts the available space to such an extent that conventional photoelectric devices can be used only with difficulty or not at all because they are too bulky so that the beam would not reach the object. In another aspect, the invention permits the gathering of light from a special source or from the general illumination, and the conducting of the light flux thus gathered towards a flux controlling object and a flux intensity detecting cell. In this application, the light conductor may to advantage replace or complement optical lens systems. In a further aspect, systems according to the invention permit the conducting of a selected light component through an area of general local illumination, whereby only the selected component will influence the cell to which it can be conducted through curved paths and restricted spaces, and whereby undesirable light can be excluded. Still further, it is an important feature of the invention to permit the use of closely adjacent beams without danger of mutual interference, and to permit easy and convenient shifting of beams by moving the beam confining conductor. Still another object of the invention is the division of light flux into component beams which are conducted to or from, or both, a light flux varying object, from a source, or towards a cell, respectively. Also, the available light flux may be rendered more effective by shaping the light receiving or emitting end surfaces of the conductor to conform to characteristics of light source, flux varying object, or cell.

These and other objects, aspects and features of the invention will be apparent from the following detailed explanation of several embodiments of the invention illustrating its genus by way of example, with reference to drawings in which:

Fig. 1 is a front view of a meter device embodying the invention;

Fig. 2 is a section on line 2—2 of Fig. 1;

Fig. 3 is a schematic view of a conveyor arrangement embodying the invention, in vertical section and with part of a lamp and relay housing broken away;

Fig. 4 is a diagrammatical vertical section through a tank incorporating a gauge according to the invention;

Fig. 5 is an elevation of a control device embodying the invention;

Fig. 6 is a top view of a counter embodying the invention;

Fig. 7 is a section on line 7—7 of Fig. 6;

Fig. 8 is a diagram illustrating the operation of the light conductor of Fig. 7;

Fig. 9 is a diagrammatic top view of textile apparatus incorporating the invention; and Fig. 10 is a section on line 10—10 of Fig. 9.

Referring to Figs. 1 and 2, a controlling meter incorporating the principles of the invention will first be described.

In a suitable housing 1, for example mounted on a wall or switchboard 2, is arranged the conventional movement 3 of a meter (as for example a bolt or amperemeter, a pressure gauge, or any other measuring device) which rotates on pivot 4 carrying an indicator 5 playing on scale 6. Scale plate 7 carries behind an arcuate slot 8 a parallax mirror 11 in front of which moves a target or shield 12 fastened to pointer 5. Housing 1 has an extension 15 with cover 16 and supporting the maximum-minimum device incorporating the present invention.

Mounted on base plate 21 of extension 15 are two supports 22, 23 with covers 24, 25 and bushings 26, 27 for example of rubber, which frictionally engage light conductors 31 and 32. These conductors are for example polished quartz rods rotating on axis 33 which also defines the center of arcuate mirror 11; the upper ends of rods 31, 32 are bent in the same direction to face mirror 11, whereas the lower ends are bent in opposite directions to face photocells 41, 42 mounted on side walls 43, 44 of housing extension 21. The electric connections 46, 47 and 48, 49, respectively, of the photocells may be brought out through insulator 50 and led to suitable amplifying and current responsive devices indicated at 40, for example constructed according to Patent No. 2,154,480.

A lamp 51, fastened to the wall with bracket 52, supplies general illumination to the instrument dial, and also the light operating the photoelectric circuits containing cells 41 and 42. Normally, light from lamp 51 is reflected by mirror 11 into the upper end surfaces of light conductors 31, 32 and maintains the photoelectric circuits energized. If the two rods 31 and 32 are set opposite points a and b, respectively, of scale 6 (Fig. 1), and if target 12 of pointer 5 arrives at one of these values, shielding the corresponding end surface from the light normally reflected thereinto by mirror 11, the respective photoelectric circuit will be abnormally conditioned, initiating any function which is desired to be performed upon the instrument indicating that value. In order to reset the instrument for a different maximum-minimum range, it is only necessary to turn the two rods in their bushings 26, 27, where they will frictionally remain in any desired position. A single light conductor may be used if only one scale value is critical.

It will be evident that the introduction of light conductors, according to the invention, involves the use of unaligned source (lamp 51), object (target 12) and cell (41, 42), compact arrangement, the gathering of light from a common source and its conduction to different cells, the conducting of a variable light flux through a field of general illumination, the segregation of closely adjacent controlling light beams, and the moving of a beam without using reflectors or similar delicate elements, simply by rotating a light conductor. If it is desired to gather a maximum of light flux, the upper surface ends of the rods may be shaped to form a square conforming to the configuration of mirror 11, as indicated at 60 in dotted lines.

Another embodiment of the invention will now be described with reference to Fig. 3. In this figure, a conveyor frame 71, for example formed by welding from side plates 72, 73 and base plate 74, defines two chutes or grooves 76, 77, in which are moved, for example by gravity, articles to be supervised, as balls 78. The side wall sheets 79 of the chutes have openings receiving the light emitting and receiving, respectively, upper end surfaces of a pair of light conductors 81, 82, mounted within the conveyor frame at 86, 87, and leading from, and towards sources constituted by lamps 91, and cells 92, respectively. Lamps and photocells are mounted in separate compartments of boxes 93, fastened within the conveyor frame and having suitable openings for the conductors. A connection cord supplying the sources and containing the necessary leads of the photoelectric circuit controlled by cells 92 is indicated at 95.

It will be evident that this arrangement does not in any way obstruct the chutes and permits convenient mounting of the photoelectric apparatus which could otherwise not be arranged within the available confined space.

The embodiment shown in Fig. 4 especially illustrates the use of a system according to the invention for correlating several controlling objects with a single source or cell, already mentioned above with reference to Figs. 1 and 2.

A tank 101 whose contents 102 is to be supervised, supports a housing 103 with holder 104 fixating relatively to the tank two series 105, 106, respectively, of light conductors extending into the tank to different depths, the lower end surfaces of pairs of conductors from respective groups forming detecting gaps 207 to 210, respectively. The upper end surfaces of the rods of group 105 are facing cell 111 which is the controlling element of a photoelectric circuit, for example according to the above mentioned patent, and the upper end surfaces of the rods of group 106 are facing light source 110.

The photocell connection may lead through conduit 112 to a gauge box 115 containing the amplification circuit controlled by cell 111, and having a gauge 116 which, for example, may be an amperemeter supplied from the photoelectric circuit and calibrated in terms of tank capacities corresponding to the levels of gaps 207 to 210. Current may be supplied to the photoelectric circuit and source 110 through wires 118. So long as the tank level remains below gap 210, a maximum of light will be transmitted across the gaps; as the level rises, the gaps will be gradually bridged by the material in the tank, and the light flux reaching cell 111 from source 110 diminished; the current in the photoelectric circuit controlled by cell 111 will correspondingly vary, the variations being indicated at 116 which, if properly calibrated, will directly indicate the level of the tank contents. Needless to say, the number of gaps may be varied in accordance with the desired measuring accuracy.

The embodiments shown in Figs. 5 to 7 particularly illustrate the advantages of my invention in instances where concentration of the controlling light flux in a small area is important. In Figure 5, 121 is a disk mounted on shaft 122 which rotates and may form part of any device whose speed is to be measured or controlled, for example, in order to close or open a circuit at given intervals by means of a friction- and inertia-less arrangement. The periphery of the disk is differentiated by making one section 123, or several sections, differently reflecting as compared to the rest of the peripheral surface 124. Two light rods 126, 127 are mounted adjacent to disk 121 and shaped to point two respective end surfaces towards the periphery of the disk, whereas the two other, larger end surfaces are arranged adjacent to a light source 131 and a photocell 132, respectively. This embodiment may incorporate an arrangement diagrammatically indicated in Fig. 5 which permits the concentration of light at a point at considerable distance from the light source, without the necessity of employing an accurately ground and distanced optical system. A lens 141 is arranged between light source 142 and face 143 of the light rod; the lens will gather considerable light flux and produce an image 142' of source 142, on face 143. The light rod 144 will then conduct almost the entire flux corresponding to image 142 towards its other end 145.

It will be evident that a lens system producing an image of the source at a considerable distance from the latter would have to be accurately mounted and centered, whereas a slight displacement of lens 141 will not considerably affect the set-up according to the invention which, further, is not influenced by environmental light and spatial conditions, since the light rods conduct their flux uninfluenced by outside light and can be bent to conform to the shape of the device incorporating it, for example, disk 121. By pointing the ends of the rods which form gap 135, the light can be concentrated upon a comparatively very small area so that mark 123 may be minute and the control accuracy correspondingly high.

Figs. 6 and 7 show a table 151 which may be suitably mounted on a frame (not shown) and supports a divided conveyor belt 152, 153 on pairs of rollers 154, 155 mounted at the ends of the table. One pair of rollers may be driven, as indicated in Fig. 7. At one end of the table is mounted a conventional feeding device with hopper 156 and feeding roller 157 frictionally engaging flat articles 158 (as checks or letters) descending in hopper 156, delivering them toward belts 152, 153, which transport them towards container 159.

A lamp 161 with shade 162 is arranged above the table which has, below the lamp, an opening 163 through which extends a light conductor 165 ending flush with the upper table surface. The conductor leads into a housing 166 containing a photoelectric arrangement with cell 167 controlled by the changes in light flux passing from source 161 to conductor 165. It will be evident that this arrangement is not at all effected by the design of the table support or frame, since the rod can be bent to lead to a cell mounted at any convenient point.

This embodiment of the invention also illustrates more particularly one of the above-mentioned advantages of the invention, namely the utilization of a larger light flux as compared with a conventional system. Referring also to Fig. 8, the cathode 170 of a flat cathode photocell, if used without light conductors, would receive a flux of the magnitude corresponding to angle $\alpha$; rod 165 introduced into this arrangement gathers and delivers a flux corresponding to angle $\beta$, which flux, as can easily be seen, is several times larger than that corresponding to angle $\alpha$.

The embodiment shown in Figs. 9 and 10 illustrates an application of the invention to devices having series of elements to be supervised and arranged in such a manner that photoelectric supervision with conventional equipment is very difficult or impossible. In these figures, frame beam 171 is part of a device for handling filamentary material, as for example a creel or warper of the type extensively used in textile plants. By suitable means, as pins 172, threads 173 are guided past beam 171. Groups 175 of supervising elements 176 are mounted on beam 171 by means of holders 175, 176 supported on brackets 177, 178 (Fig. 10). In order to make the threads more easily accessible, at least the upper groups may be mounted on hinges 181 so that they can be turned back to rest on stops 182. Each supervisory group consists of a number (here five) of elements each having a light supplying and a light receiving conductor 185, 186, respectively, a light source 187 with hood 188 extending over all supplying elements, and individual photocell elements 191 fastened to the lower ends of each individual receiving rod 186. The intermediate ends of both rods of each element are at 187 shaped to conform to the extended configuration of the threads, which makes a comparatively large amount of light flux available for detecting purposes.

Each cell 191 controls a photoelectric relay circuit similar as for example shown in Fig. 1, and these circuits may for example operate means for stopping the thread handling device, and for individually indicating a defective thread changing the flux condition between supplying and receiving conductors. For this purpose there may for example be employed an indicator announcing the number of the defective thread.

It should be understood that the present disclosure is for the purpose of illustration only and that this invention includes all modifications and equivalents which fall within the scope of the appended claims.

I claim:

1. Photoelectric control installation comprising a light source, a light responsive relay means including a photoelectric cell, means defining a point where an object controlling the intensity of light flux through that point may be positioned, and a light conductor for leading light coming from said source through said point toward said cell and having near said point a light transmitting end surface, said end surface being shaped substantially to conform to the configuration of said object for the purpose of providing an increase of light flux control by the object.

2. Device for supervising filamentary material comprising means for guiding a series of filaments, a light source, an electric relay circuit including a photoelectric cell for each filament, and a series of light conductors from said source to individual filaments and a second series of light conductors from the filaments to respective cells.

3. Device for supervising filamentary material comprising means for guiding a series of filaments, a light source, an electric relay circuit including a photoelectric cell for each filament, and a series of light conductors from said source to individual filaments and a second series of light conductors from the filaments to respective cells, the emergent end faces of said first series and the receiving end faces of said second series being flattened to cover a length of filament, and said conductors being aligned at an oblique angle to said threads in order to accommodate conductors and cells extending beyond the shortest distance betwen adjacent filaments.

4. Photoelectric control device comprising a light source, means defining the path of a light intensity varying object, a light responsive relay means including a photoelectric cell stationary relatively to said path defining means, optical means including a light-conducting rod for leading light from said source towards said cell, said rod having a light transmitting end surface adjacent said path, and means for changing the position of said surface along said path by moving said rod, thereby changing the effective position of said object.

5. A control meter comprising a movement, a light intensity varying object shifted by said movement in a predetermined path, electric relay means including a photoelectric cell stationary relatively to said movement, a light source illuminating said object, a light conductor leading from said path to said cell, and means for shifting said conductor relatively to said path, whereby said light varying object upon approaching said conductor at a selected point of said path affects the light flux therein and hence the conditioning of said cell and said relay means.

ARTHUR G. B. METCALF.